(12) United States Patent
Yan (10) Patent No.: US 8,444,060 B2
(45) Date of Patent: May 21, 2013

(54) FUEL INJECTOR WITH DETERIORATION DETECTION

(76) Inventor: Mi Yan, Columbus, IN (US)

( * ) Notice: Subject to any disclaimer, the term of this patent is extended or adjusted under 35 U.S.C. 154(b) by 726 days.

(21) Appl. No.: 12/218,673

(22) Filed: Jul. 17, 2008

(65) Prior Publication Data

US 2009/0020630 A1 Jan. 22, 2009

Related U.S. Application Data

(60) Provisional application No. 60/959,859, filed on Jul. 17, 2007.

(51) Int. Cl.
*F02D 1/06* (2006.01)

(52) U.S. Cl.
USPC ... 239/5; 239/71; 239/73; 239/88; 239/533.2; 239/585.1

(58) Field of Classification Search
CPC ...... B67D 7/08; B05B 1/30; B05B 1/34; F02D 1/06; F02M 39/00; F02M 47/02; F02M 59/00
USPC ............... 239/585.1–585.5, 533.1–533.15, 239/71, 73, 88–90, 5; 123/294, 446
See application file for complete search history.

(56) References Cited

U.S. PATENT DOCUMENTS

| | | | | |
|---|---|---|---|---|
| 4,576,129 A * | 3/1986 | Wallenfang et al. | .......... | 123/357 |
| 4,594,924 A * | 6/1986 | Windisch | .......... | 83/177 |
| 5,076,236 A * | 12/1991 | Yu et al. | .......... | 123/467 |
| 6,390,384 B1 * | 5/2002 | Sato et al. | .......... | 239/91 |
| 6,880,770 B2 * | 4/2005 | Jameson et al. | .......... | 239/533.2 |
| 2007/0295003 A1 * | 12/2007 | Dingle et al. | .......... | 60/301 |

* cited by examiner

*Primary Examiner* — Steven J Ganey (57) ABSTRACT

A fuel injection apparatus with a deterioration detection device that includes a volume changing chamber, the volume of which is determined by fuel pressure inside the injector. After injector nozzle opens, the time for the volume changing chamber to change from an initial volume to a target volume is measured and used for calculating changes in nozzle orifice size. The value of orifice size change can be used for both diagnosing injector deterioration and compensating fuel flow rate in a feedback control. In addition to detecting injector deterioration and failures, the volume changing device also dampens effects of noise in fuel pressure to fuel flow rate control and decreases chances of after-injection and second injection.

17 Claims, 10 Drawing Sheets

FUEL INJECTOR WITH DETERIORATION DETECTION

This present application claims priority from U.S. provisional application No. 60/959,859 having the same title as the present invention and filed on Jul. 17, 2007.

FIELD OF THE INVENTION

The present invention relates to a fuel injection apparatus that provides and controls fuel flow.

BACKGROUND OF THE INVENTION

Fuel injectors are used to direct fuel pulses into a combustion chamber. Normally in a fuel supply system, fuel pumps deliver and pressurize fuel from a storage tank to fuel injectors or to an accumulator that connects to fuel injectors. Inside a fuel injector, a nozzle assembly including a nozzle valve (nozzle needle valve) is used to control fuel flow through nozzle orifices. At "off" position, the nozzle valve blocks fuel flow. When the nozzle valve moves to "on" position, fuel is presses through the orifices. The overall fueling rate is determined by the injector "on" time.

Fuel injectors in different applications have different requirements for fuel pressure. For example, in CI (Compression Ignition) engines (diesel engines), high fuel pressure is needed for better fuel atomization and spray penetration, while in SI (Spark Ignition) engines, fuel pressure is lower due to the fuel/air pre-mixing nature. Even in some applications for diesel engines, for example, fuel dosing (used with a DOC in increasing exhaust air temperature) in regenerating DPFs (Diesel Particulate Filters), low pressure fuel systems (<20 bar) are used. When the nozzle valve opens (injector at "on" status), fuel flow rate is a function of fuel pressure for a given injector. Accordingly, in fuel flow control, the injector "on" time is a function of fuel pressure inside the injector.

To decrease emission, increase combustion efficiency, and improve combustion control performance, fuel flow needs to be controlled accurately. However, due to limitations of sensor accuracy, sensor response time, system complexity, and cost, it is hard to implement a feedback loop in fuel flow control. As a result, accurate nozzle valve timing control and steady fuel pressure inside the injector are required.

Another important factor that affects fuel flow control accuracy is injector deterioration or aging. Normally fuel injectors (especially diesel fuel injectors) work in an environment with high temperature and high concentration of particulate matter. Consequently, carbon (and other particles) could build up on the nozzle surface, partially blocking nozzle orifices and deteriorating fueling control performance, resulting in poor system performance and more emission. The injector deterioration is more significant in applications with short operation time. For example, in aftertreatment systems using DPFs, high exhaust temperature is generated by burning fuel in a DOC or combustion chamber (burner), and a fuel injector is used in controlling fueling rate. Since the regeneration is only needed when too much soot accumulates in the filter, the interval between regenerations could be hours or days. In this application, there is long period of time for carbon to build up on injector surface without disturbing from fueling flow. Injector deterioration changes fuel spray pattern and causes large error between actual fueling rate and fueling command. These effects result in changes in system gain (ratio of exhaust temperature increase to fueling rate), and temperature control performance deteriorates therewith.

If the nozzle orifice change is measurable, the value of changed orifice size can be used for compensating fueling control: when orifices become smaller due to deterioration, we can increase injector "on" time to compensate fueling rate change. However, due to limitations of sensor technology and OBD (On-board Diagnostics) technology, it is hard to accurately and reliably measure orifice change in-situ using a compact and economic device.

BRIEF SUMMARY OF THE INVENTION

It is an objective of the present invention to provide a fuel-injection device with an apparatus that can be used in examining orifice size change, the value of which then is used for adaptively adjusting fueling control.

Another objective of the present invention is to provide a fuel-injection device with fuel flow insensitive to noise in fuel pressure.

Yet another objective of the present invention is to provide a fuel-injection device that is resistive to after injection and second injection.

In one embodiment of the present invention, these objectives are achieved by providing a fuel injector with a channel communicating to its nozzle pressure chamber. Inside the channel, a sliding piston with one end attached to a spring prevents high pressure fuel from flowing back to fuel tank. The piston moves when there is a difference between the fuel pressure drop (the difference between fuel pressure inside the pressure chamber and combustion chamber) and the stress provided by the spring. The channel together with the piston form an adjustable augmentation to the pressure chamber, and the volume of this chamber augmentation, which is determined by piston displacement, is proportional to the fuel gauge pressure.

Inside the channel, the piston position is an indication of fuel gauge pressure. Therefore, by using the relation between the fuel pressure drop and piston displacement, we are able to detect changes in nozzle orifice size. In one exemplary application of the present invention, the injector is used in a common rail fuel injection system in which a shutoff valve is used for controlling fuel supply to the injector. In a diagnostic process, the shutoff value is energized first (fuel supply is then shut off). Then the injector is open. The time for the piston moving from a starting position, which is determined by fuel gauge pressure before the injector is open, to a stop position, is a function of orifice area: if piston mass is small, piston moving time is reversely proportional to orifice area. Accordingly, by timing the pressure decaying from an initial value to a target value, we are able to calculate orifice area. Resolution of the measurement is determined by the cross section area of the channel and the spring coefficient for a given pressure decay.

In another embodiment of the present invention, electronic switches are installed inside the channel for detecting piston movement. This device allows a diagnostic process without using fuel pressure sensors, since pressure decay time can be obtained by detecting pulses generated by electronic switches. Further more, when multiple switches are installed or a position sensor is used, during an injection, the time for fuel pressure drops from an initial value to a value determined by fuel pressure distribution can be detected for calculating orifice area change. By using this method, orifice area can be monitored during normal operations (without a dedicated diagnostic process), and the value can also be used for adjusting fueling rate in real-time feedback control.

In addition to being used for detecting orifice area change, the piston movement also dampens effects of noise in fuel pressure to fueling rate control. For high pressure injectors, the piston movement makes the channel act as a large orifice to a fast moving injector needle, thereby preventing trapped fuel from building up a high pressure pulse, which results in after-injection and second injection. Decreasing of the high pressure pulse at the end of injections also allows a small nozzle sac design, which reduces emission.

DETAILED DESCRIPTION OF THE INVENTION

Figure 1:
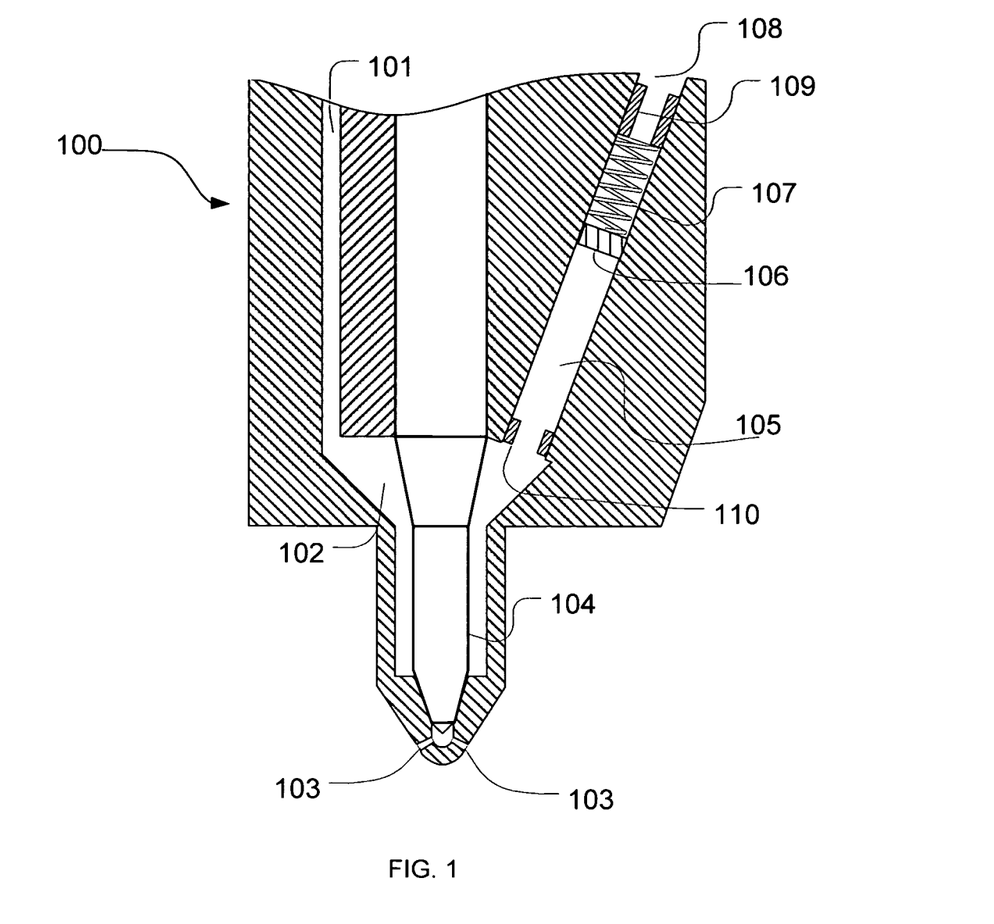
FIG. 1 is a cross-sectional schematic view illustrating the bottom part of an injector with a deterioration detection apparatus according to a first embodiment of the present invention.

As illustrated in FIG. 1, in an embodiment of the proposed injector 100, high pressure fuel flow through a channel 101 into a pressure chamber 102. A valve needle 104 controls fuel injection, which starts when the needle leaves orifices 103 and stops when the orifices are obturated. In addition to the channel 101, there is another channel 105 connecting to the pressure chamber. A sliding piston 106 is inside the channel 105 with one end attached to a spring 107. Above the spring 107, there are a retainer 109 and a fuel passage 108. Fuel leaked from the channel 105 is discharged to fuel tank through the passage 108, and the pressure inside the passage is approximately ambient pressure. The piston 106 moves when the pressure inside the chamber 102 varies, and the movement is limited by another retainer 110.

Assuming the flow through the nozzle 103 is quasi-steady, the flow rate is a function of fuel pressure drop:

$$\dot{m}_f = C_D A_n \sqrt{2\rho_f \Delta p}, \quad (1)$$

where $$\Delta p = p_i - p_c;$$

$p_i$ is the fuel pressure inside the injector pressure chamber, $p_c$ the fuel pressure in combustion chamber, $\dot{m}_f$ the fuel mass flow rate, $C_D$ the discharge coefficient, $A_n$ the overall cross section area of orifices (orifice area), and $\rho_f$ the fuel density.

In the channel 105, fuel volume change can be described using the following equation:

$$m\ddot{v} + k_f \dot{v} + k_e v = -(p_i - p_0) A^2 \quad (2)$$

where m is the mass of the piston 106, $k_f$ the friction coefficient of the channel 105 to the piston 106, $k_e$ the spring coefficient, A the cross section area of the channel 105, $p_0$ the pressure in the fuel passage 108, and the volume v is defined by the following equation:

$$v = xA \quad (3)$$

In equation (3), x is the distance between the position when the spring 107 is in equilibrium status, and the position when a pressure $(p_i - p_0)$ is applied.

When the weight of the piston 106 is very small and thus negligible, and the friction coefficient or moving speed of the piston 106 is very low, equation (2) can be approximated using the following equation:

$$k_e v = -(p_i - p_0) A^2 \quad (4)$$

Equations (1) and (2) or (4) describes the relations among the pressures $p_i$, $p_0$, and $p_c$, fuel mass flow rate $\dot{m}_f$, and the movement of the piston 106. When fuel flow to the injector is cut off, e.g., when a shut-off valve between the fuel supply to the injector is energized, if the injector nozzle is open, the fuel mass flow will be solely provided by the movement of the piston 106:

$$\dot{m}_f = \dot{v} \rho_f \quad (5)$$

In this situation, according to equation (1), (4) and (5), the relations among fuel pressure, combustion chamber pressure, and ambient pressure can be described using the following equation:

$$\frac{-A^2 \rho_f}{k_e} \cdot (\dot{p}_i - \dot{p}_0) = C_D A_n \sqrt{2\rho_f (p_i - p_c)} \quad (6)$$

Assuming during injection, ambient pressure and combustion chamber pressure keep constant, i.e., $\dot{p}_0 = 0$, and $\dot{p}_c = 0$, then solving equation (6), we have the solution:

$$\Delta p = \left( \sqrt{\Delta p_0} - \frac{C_D A_n k_e \sqrt{2\rho_f}}{2A^2 \rho_f} t \right)^2 \quad (7)$$

In equation (7), $$\Delta p_0 = p_i^0 - p_c^0;$$

$p_i^0$ and $p_c^0$ are, respectively, the injector fuel pressure and combustion chamber pressure when the nozzle starts to open. According equation (7), if the spring 107 is relaxed when (or before) the piston 106 reaches the retainer 110, the pressure decay time $t_d$, which is defined as the time from the moment the nozzle starts to open until a zero pressure drop ($\Delta p = 0$) is detected, is a function of the orifice area:

$$t_d = \frac{A^2 \sqrt{2\rho_f \Delta p_0}}{C_D A_n k_e} \quad (8)$$

Thus, the orifice area $A_n$ can be calculated using the following equation:

$$A_n = \frac{A^2 \sqrt{2\rho_f \Delta p_0}}{C_D t_d k_e} \quad (9)$$

Figure 2A:
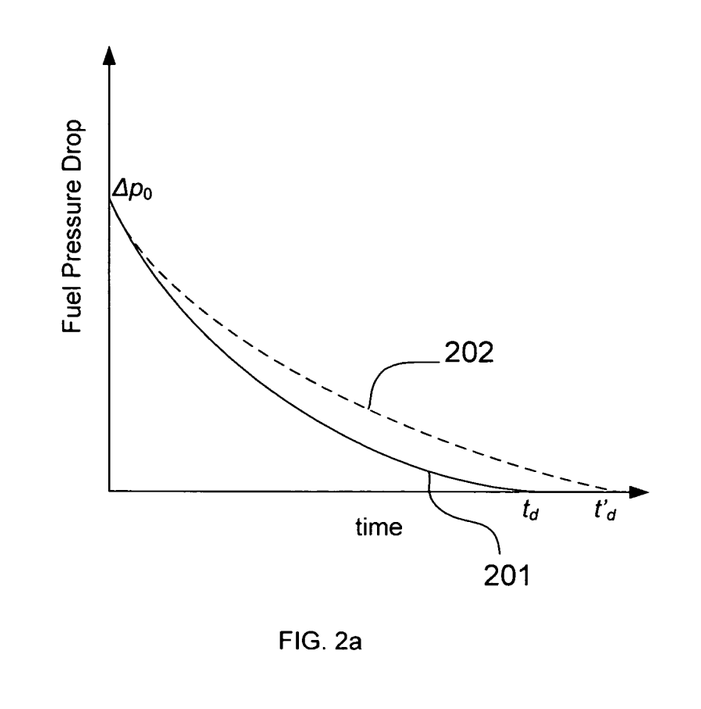
FIG. 2*a* and FIG. 2*b* shows curves of fuel pressure drop in pressure decay processes.

FIG. 2a shows decay curves of the fuel pressure drop Δp. In this figure, a curve 201 shows the curve of fuel pressure drop in a healthy injector. When the orifice area decreases, the fuel pressure drop follows a curve 202. Using equation (9), by measuring the pressure decay time, we can monitor the orifice area change. And this calculated orifice area value can also be used for adaptively adjusting the pressure compensation table (according to equation (1)) in fuel injection pulse control.

Another method for detecting change in orifice area is measuring fuel pressure drop Δp before the piston 106 reaches the retainer 110. According to equation (7), if the fuel pressure drop at time $t_s$ ($t_s < t_d$) is $\Delta p_s$, then, $$t_s = \frac{A^2 \sqrt{2\rho_f}}{C_D A_n k_e} (\sqrt{\Delta p_0} - \sqrt{\Delta p_s})\qquad(10)$$

and $$A_n = \frac{A^2 \sqrt{2\rho_f}}{C_D t_s k_e} (\sqrt{\Delta p_0} - \sqrt{\Delta p_s})\qquad(11)$$

Therefore, based on the pressure at the moment when the nozzle is open and pressure at time $t_s$, we can calculate the orifice area using equation (11).

Figure 2B:
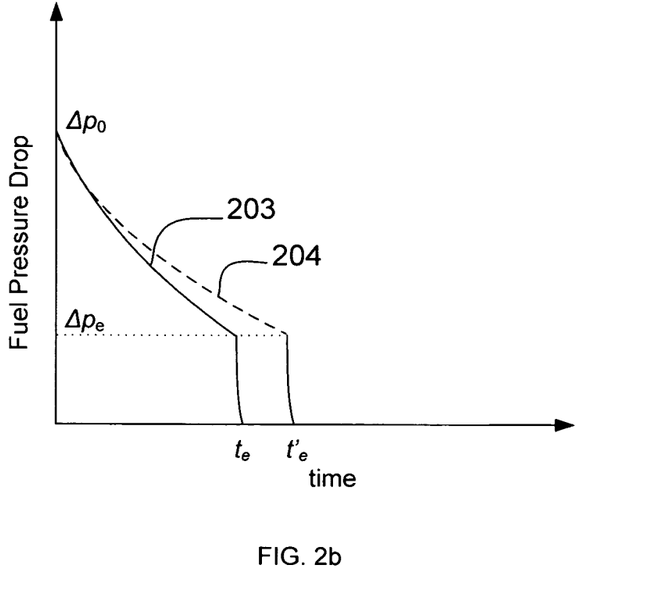

If the length of channel 15 is short, and when the piston 106 reaches the retainer 110, the spring 107 is still in compression, fuel pressure decay time is shorter than that calculated using equation (9). In this situation, as shown in FIG. 2b, the value of Δp drops sharply when the piston 106 hits the retainer 110 at time $t_e$. The sudden pressure drop is caused by a much faster decay process at $t_e$. Accordingly, based on equation (11), we can monitor the value change of Δp and use the pressure value $\Delta p_e$ at $t_e$ for calculating the orifice area:

$$A_n = \frac{A^2 \sqrt{2\rho_f}}{C_D t_e k_e} (\sqrt{\Delta p_0} - \sqrt{\Delta p_e})\qquad(12)$$

As depicted in FIG. 2b, curves 203 and 204, respectively, are the fuel pressure drop of a normal nozzle and a deteriorated one. If initial pressure $\Delta p_0$ is the same, for a deteriorated injector with a smaller orifice area, the moment when the fast decay starts ($t'_e$) comes later than that for a normal injector ($t_e$). Therefore, the degree of deterioration can also be monitored by simply measuring the slow pressure decay time $t_e$, when keeping the initial pressure constant.

Figure 3:
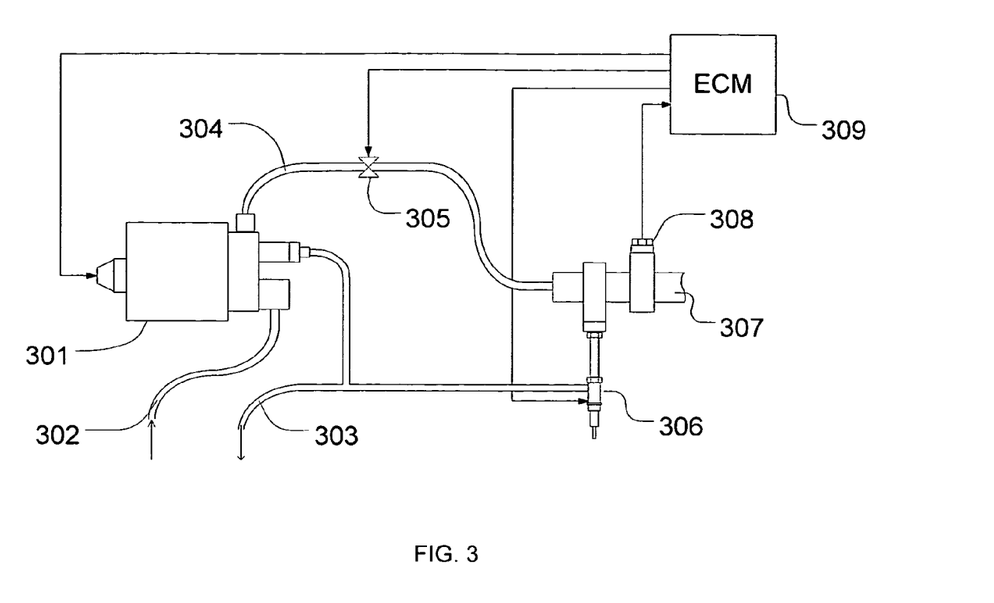
FIG. 3 illustrates an example using a deterioration detection apparatus in accordance with the present invention in a common rail fuel injection system.

FIG. 3 shows an example of using the proposed injector in a common rail diesel fuel injection system. In this system, a fuel pump 301 is used for providing high pressure fuel supply to a common rail accumulator 307 through a fuel line 304. A shutoff valve 305 controls fuel flow in the fuel line 304, and the fuel pressure inside the accumulator 307 is measured by a pressure sensor 308. An injector 306 is connected to the accumulator 307. Low pressure fuel is supplied to the fuel pump 301 through a fuel line 302, while a fuel return line 303 is connected to both of the pump 301 and the injector 306 for ducting fuel back to a fuel tank (not shown in FIG. 3). The fuel pressure inside the accumulator 307 is controlled by an ECM 309 through the pump 301 with fuel pressure fed-back from the sensor 308. The injector and the shutoff value are also controlled by the ECM 309.

Figure 4:
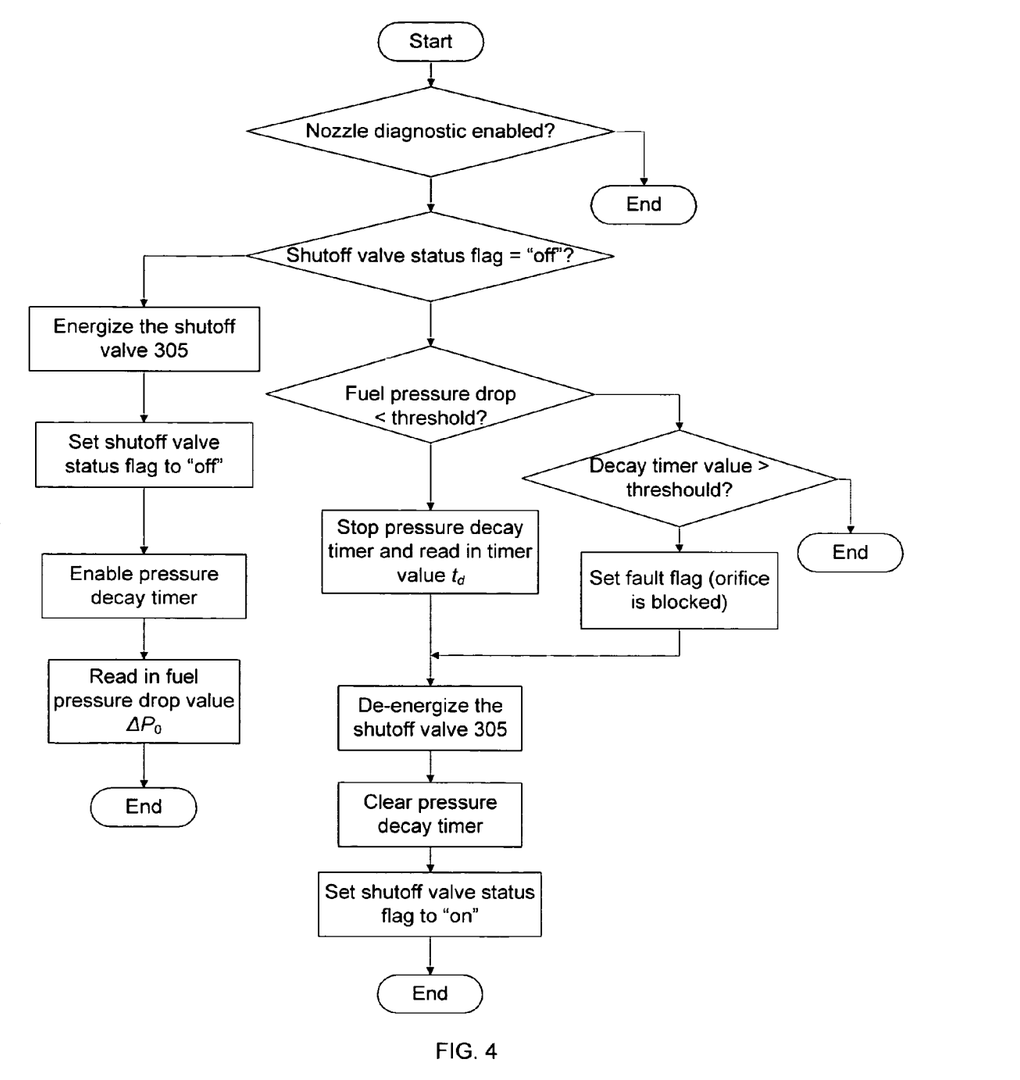
FIG. 4 is a flow chart of an example in which orifice area is measured in a diagnostic process with a deterioration detection apparatus in accordance with the present invention.

A diagnostic process example for this common rail fuel system is illustrated in FIG. 4. The diagnostic process can be realized using an interrupt service routine in the ECM. At the beginning of this process, with the nozzle diagnostic enabled, a shutoff valve status flag is examined. If the status flag is "on", the shutoff valve 305 is energized and fuel flow in the fuel line 304 is shut off. The shutoff valve status flag is then set to "off" thereafter, and a fuel pressure decay timer is enabled. Before the routine ends, the fuel pressure drop value is read in and saved as $\Delta p_0$. If the status flag is "off", then fuel pressure drop value is read in and compared with a threshold. The system defines the ending time of pressure decay as the moment when the fuel pressure value is lower than this threshold. If pressure decay ends, the fuel pressure decay timer value is saved as $t_d$, otherwise the routine ends except the decay time is too long. An overly long decay time is caused by a blockage in the nozzle. At this situation, a fault flag is set to report a serious deterioration. After pressure decay ends or a too long decay time is detected, the shutoff valve 305 is de-energized, and the fuel pressure decay timer is cleared. The shutoff valve status flag is reset to "on" for the next diagnosis.

After the diagnostic process completes, orifice area is calculated using values of $\Delta p_0$ and $t_d$ according to equation (9). The orifice area value can be used for adaptively adjusting fueling by correcting fuel pressure, injection pulse duration (according to equation (1)), and/or used directly to report a deterioration when a significant change is detected.

Figure 5A:
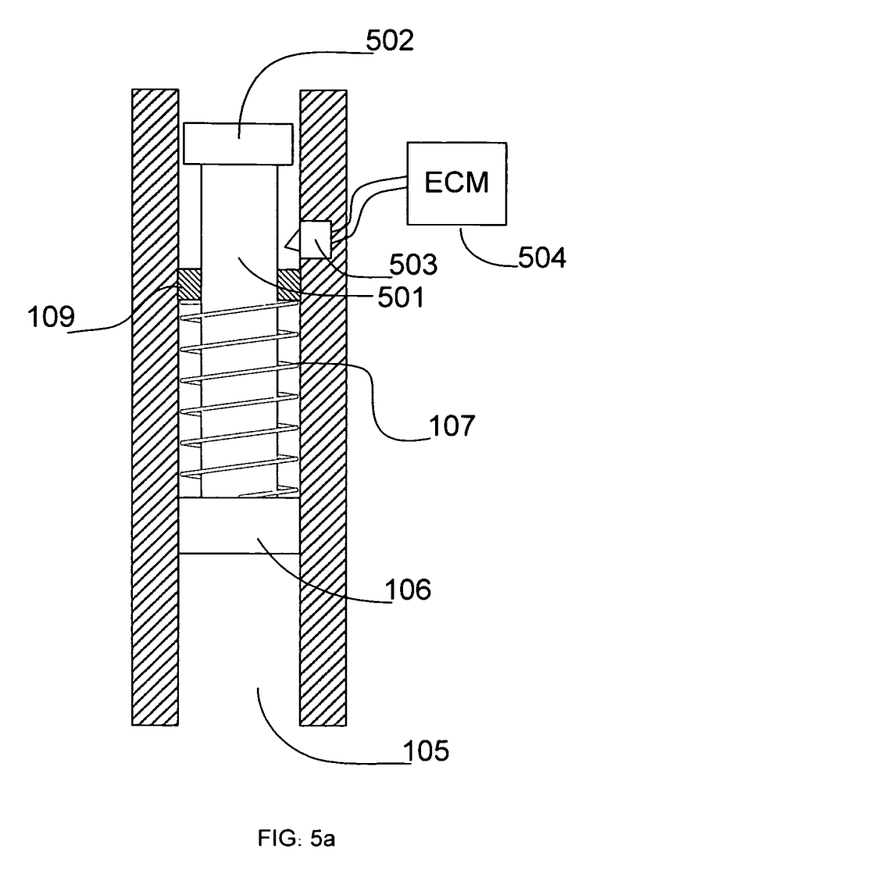
FIG. 5*a* and FIG. 5*b* are cross-sectional schematic views showing a second embodiment of the present invention.

In a fuel injection system, depending on the location and response time of the fuel pressure sensor, there could exist an uncertainty in detecting the pressure decay ending time. This uncertainty affects the accuracy in measuring orifice area, and according to equation (9), the error is determined by the pressure decay time: smaller error is induced by long pressure decay time and vice versa. In order to decrease this uncertainty, an electronic switch can be used for detecting the pressure decay ending time. As illustrated in FIG. 5a, a cap 502 is connected to the piston 106 through a rod 501. The retainer 109 limits the position of the piston 106 before fuel pressure drops to combustion chamber pressure. An electric switch 503 is installed inside the channel 105 and above the retainer 109. When the cap 502 passes by the switch 503 during pressure decay, it presses the switch and thereby an electrical pulse signal is generated. An ECM 504 connecting to the electrical switch 503 detects the pulse signal, and calculates the decay time $t_d$ as $t_d = t_1 - t_2$, where $t_1$ is the time when injection starts and $t_2$ the time when the switch pulse signal is detected.

Figure 5B:
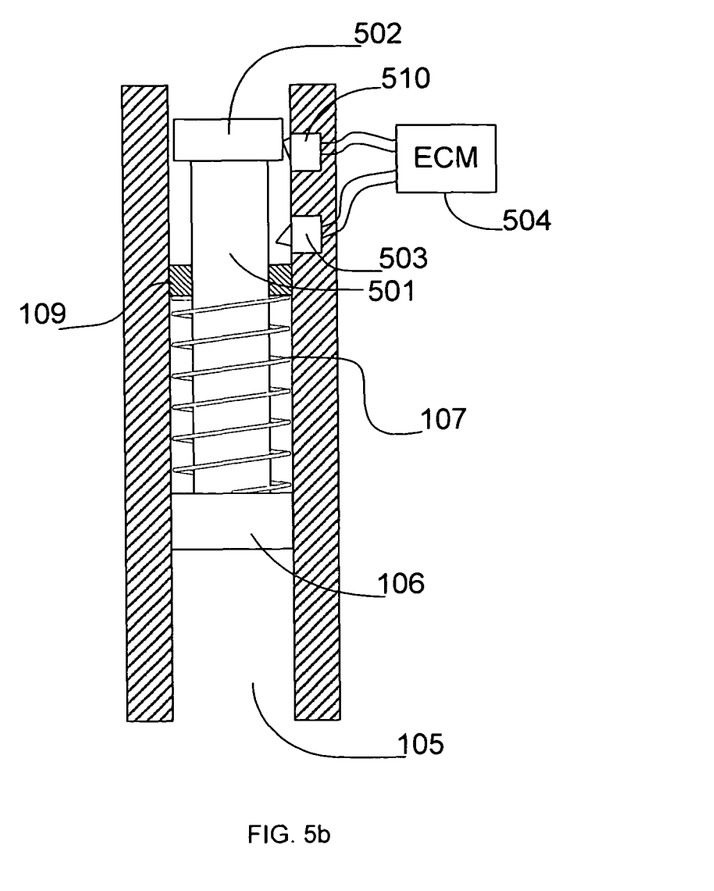

Variations in the initial pressure $\Delta p_0$ also affect the measurement of orifice area. To decrease this effect, another electrical switch can be used for detecting the initial position of the piston 106. As depicted in FIG. 5b, in addition to the switch 503, another switch 601 (also connects to the ECM 504) is positioned above the switch 503. When high pressure fuel enters the channel 05, the piston 106 together with the cap 502 is pushed upwards. At pressure $\Delta p_0$, the switch 601 is pressed by the cap 502 and an electrical pulse signal is generated. This pulse signal is received by the ECM 504 as an indication of fuel pressure drop reaching $\Delta p_0$. (This feature can also be used for diagnosing fuel pressure sensor or control failures that causes low pressure fuel supply) During a pressure decay process, when fuel pressure drops, the cap 502 moves downwards. After the cap 502 leaves the switch 510, a pulse is generated. This pulse is detected by the ECM 504, and a timer is enabled. When the cap 502 reaches at the switch 503, another pulse is generated, and the timer is disabled. The timer value is the decay time $t_d$ and used for monitoring the injector deterioration.

Figure 6A:
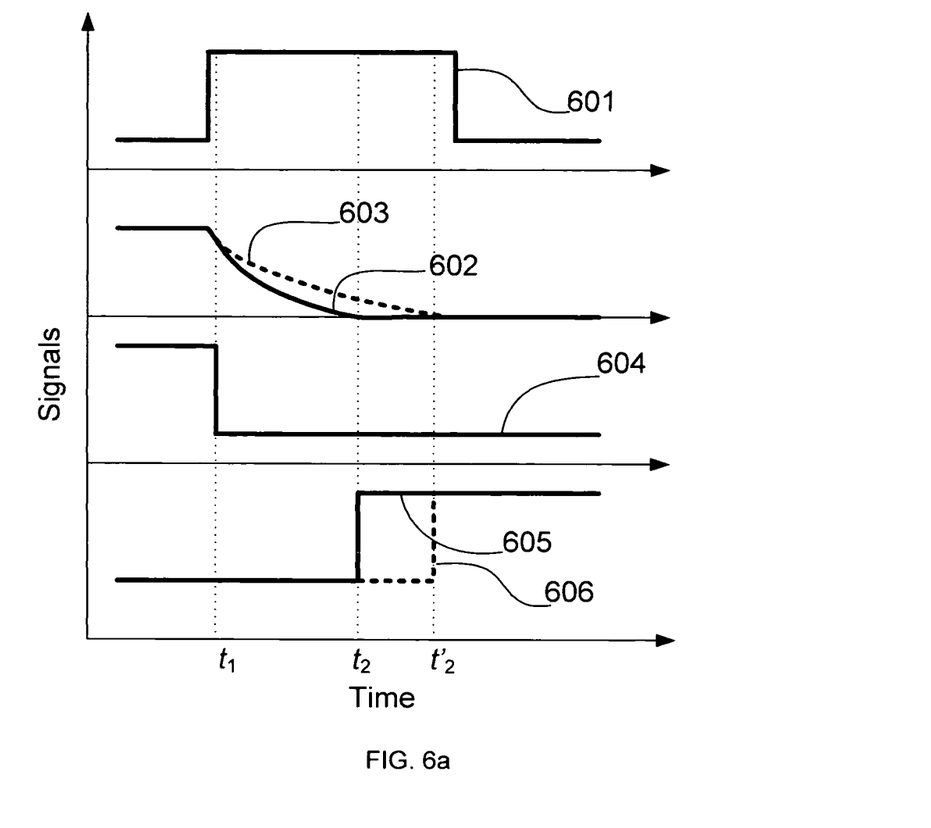
FIG. 6*a* and FIG. 6*b* are timing diagrams of signals obtained from electronic switches installed on a deterioration detection apparatus in accordance with the present invention, injector control signals, and signals acquired from fuel pressure sensors.

FIG. 6a shows the signal timing chart in such a system. The injection command is a pulse 601. High level of this pulse enables injection. When the shutoff value is closed during injection, fuel pressure drop Δp (curve 602) decreases after the injection starts. When the Δp value drops below Δp$_0$ at a moment t$_1$, a falling edge of a pulse 604 is generated by the switch 510. As the Δp value is below a level, at a moment t$_2$, the cap 502 presses the switch 503, a rising edge of a pulse 605 is generated. The interval between the moments t$_1$ and t$_2$ is the decay time t$_d$. When orifice area becomes smaller, the Δp value drops slower (curve 602) according to equation (8). As a result, the moment when the cap 502 reaches at the switch 503 (t'$_2$) becomes later (pulse 606). The difference between t$_2$−t$_1$ and t'$_2$−t$_1$ is an indication of orifice area variation.

In an injector shown in FIG. 5b, by employing the two electronic switches, even if there is not a shutoff value in the system, we are still able to monitor the orifice area change, though the relation between the piston moving time and orifice area is more complex that that described by equation (9).

Figure 6B:
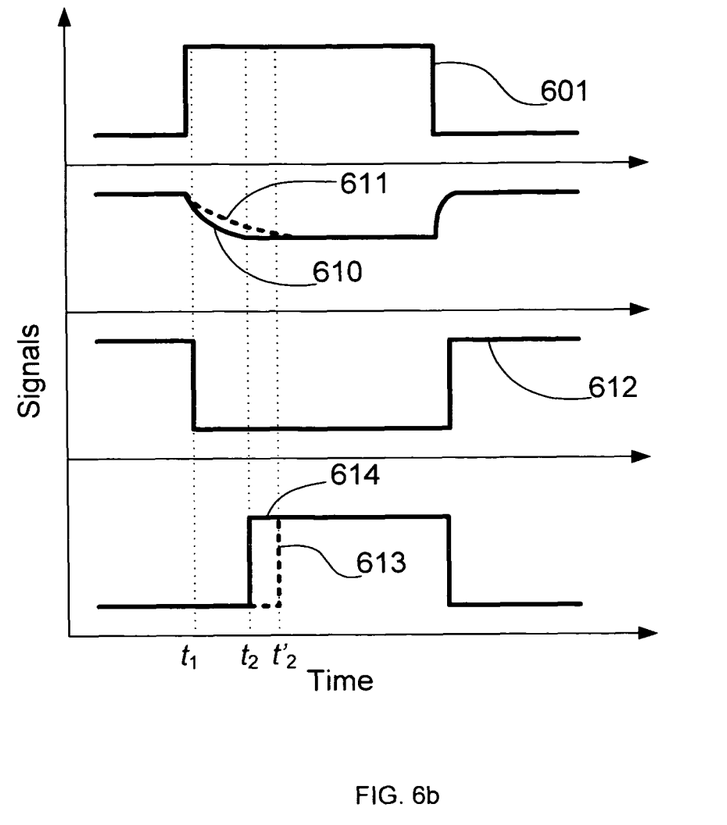

FIG. 6b illustrates the timing chart for an injection system without shutoff value. At the rising edge of the injection command 601, due to pressure gradient, the piston 106 moves as fuel pressure inside the channel 105 drops (curve 610). When the Δp value drops below Δp$_0$, the switch 510 is released and a falling edge of pulse 612 (t$_1$) is generated. As the fuel pressure decrease causes the piston 106 press the switch 503, a rising edge of pulse 614 (t$_2$) is generated. For a deteriorated injector with smaller orifice, due to slower pressure drop (pulse 611), under the same operating conditions (same combustion chamber pressure), the moment when the switch 503 is pressed on (t'$_2$) is later (pulse 613). Therefore, the interval between the pulse falling edge generated by the switch 510 and the pulse rising edge generated by the switch 503 is an indication of injector deterioration.

In the system depicted in FIG. 5b, if cost allows, electrical switches 503 and 510 can also be replaced with a strain/distance/position sensor, e.g. an induction ring, an eddy current sensor, a potentiometer, or an optical sensor. Through the position sensor, more detailed kinetics of piston movement can be monitored, and thereby a more sophisticated model can be used for better identifying injector deterioration and accurately calculating orifice area value during normal operations.

In addition to monitoring changes of actual orifice area, the apparatus of the present invention can also be used for detecting failures equivalent to orifice area change, such as injector leakage and injector being stuck off, and injector being stuck open. When an injector is stuck open, the ECM cannot command fuel injection off. As a result, extra fueling will be directed into combustion chambers. This extra fuel causes emission issues, and more seriously, if a DOC is installed at the downstream of the injector, the fuel could be burnt inside the DOC, causing safety issues. Using the apparatus in the present invention, if after the shutoff valve is energized, a fuel pressure decay is detected before the injector is commanded open, or when the injector is commanded open, however no pressure decay is detected, then the injector is stuck open.

The injector of the present invention is resistive to noise in fuel pressure. In the injector depicted in FIG. 1, changes in fueling rate can be described using an equation:

$$\dot{v}_{in} = \dot{v}_{out} + \dot{v} \quad (13)$$

where $\dot{v}_{in}$ is the volumetric flow rate of fuel entering the injector, $\dot{v}_{out}$ the volumetric injection fuel flow rate and $$\dot{v}_{out} = \dot{m}_f / \rho_f \quad (14)$$

$\dot{v}$ the rate of injector volume change caused by the piston (106) movement.

According to equations (1), (4), (13), and (14), the fuel pressure drop Δp, which determines fueling rate, follows the relationship:

$$\sqrt{\Delta p} = \frac{\sqrt{\rho_f}\left(\dot{v}_{in} - \frac{\dot{\Delta p} A^2}{k_e}\right)}{\sqrt{2}\, C_D A_n} \quad (15)$$

When the system is at steady status, i.e., $\dot{\Delta p}=0$, equation (15) shows that the rate of feeding volumetric flow $\dot{v}_{in}$, equals to the injection fueling rate $\dot{v}_{out}$ (equation (14)), meaning that the injection fueling is fully provided by the fuel supply to the injector. When the volumetric flow rate $\dot{v}_{in}$ varies, the fuel pressure drop Δp will change with it. However, with the movement of the piston 106, a term $$\frac{\dot{\Delta p} A^2}{k_e}$$

is created and this term is deducted from the volumetric flow rate $\dot{v}_{in}$. As a result, the overall variation is damped.

Figure 7:
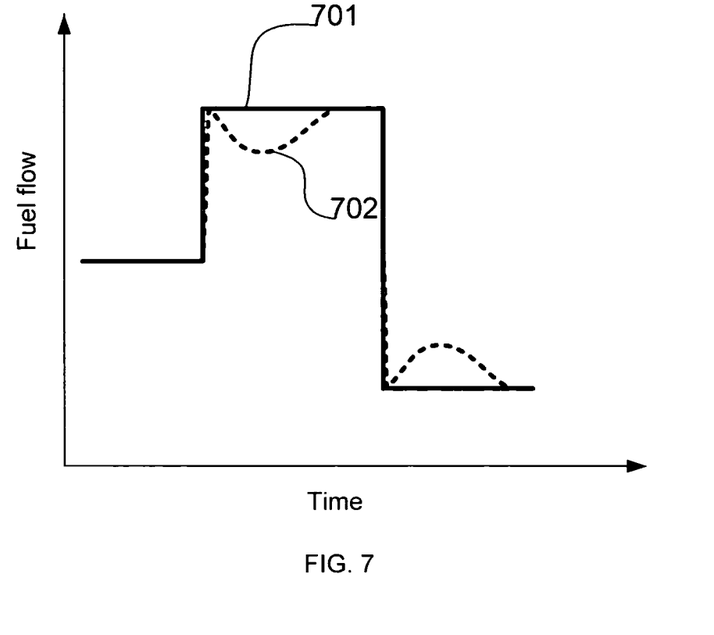
FIG. 7 illustrates changes in fuel flow rate with pulse-like noise in fuel supply in an injector with a deterioration detection apparatus according to the present invention.

FIG. 7 shows injection fueling rate change when there is a pulse-like sudden variation (curve 701) in the feeding flow rate $\dot{v}_{in}$. At the rising edge of the pulse (curve 701), the injection fueling rate $\dot{v}_{out}$ (curve 702) immediately follows $\dot{v}_{in}$. Then, with the movement of the piston 106, a flow to the channel 105 decreases the change in injection fueling rate. When piston moving speed slows down, injection fueling rate increases, and when the piston 106 eventually stops moving, the injection fueling rate $\dot{v}_{out}$ equals to $\dot{v}_{in}$ again. Similar change of fueling rate can be found at the falling edge of the feeding flow pulse. According to equation (15), and as shown in FIG. 7, piston movement acts like a band-rejection filter in damping variations of injection fueling rate. The channel area A and the spring coefficient k$_e$ are the two most important parameters of the filter.

In addition to damping variations of injection, the piston movement can also help in decreasing after-injection and secondary injection. At the end of an injection, when the needle valve is catapulted back towards to its seat, without the piston 106, the high pressure fuel trapped inside the pressure chamber may cause a reflecting pulse that "bounces" the needle and generates after-injection. Coupling with the movement of return spring, the reflecting pulse may further travel back and forth inside the high pressure chamber, unseating the needle and leading to a secondary injection. The after-injection and secondary injection spill unexpected extra fuel during the latter portion of an expansion stroke causing extra HC (Hydrocarbon), CO (Carbon Monoxide), and PM (Particulate Matter) emission.

In an injection system with the piston 106, the piston movement releases part of the high fuel pressure built up during the fast moving of injector needle. According to equation (15), when there is a sudden change of Δp value, the large value of pressure changing rate $\dot{\Delta p}$ causes large value of the term $\dot{p}A^2/k_e$, which is deducted from the pressure Δp, thereby the change of the pressure Δp is decreased. Consequently, after-injection and secondary injection due to the fast movement of injector needle are decreased. Decrease of high fuel pressure pulses also allows small sac nozzle design, which helps in decreasing emission.

The invention claimed is:

1. A fuel injection apparatus, comprising:
an injector body casting containing a fuel passage and at least one orifice communicating to said fuel passage to discharge fuel;
a common rail providing high pressure fuel supply to said fuel passage;
a nozzle valve element slidably disposed adjacent said orifice, controlling fuel flow by moving from an open position in which said fuel passage is fluidly connected to combustion chamber, and fuel flows through said orifice under pressure provided by said common rail, and a closed position in which said fuel passage is disconnected to combustion chamber, and fuel flow is blocked by said nozzle valve; and
at least one volume changing device having no more than two openings, one of which communicates to said fuel passage, and being configured to change its volume with the fuel pressure inside said fuel passage when said nozzle valve is in its open position.

2. The fuel injection apparatus of claim 1, wherein said fuel passage includes a pressure chamber cavity which directly connects to said volume changing device and said orifice.

3. The fuel injection apparatus of claim 1, wherein said volume changing device includes at least one channel and a piston disposed inside, and said piston has a spring mounted at one end of said channel for controlling the volume of said volume changing device.

4. The fuel injection apparatus of claim 3, wherein the moving range of said spring is limited by two retainers inside said channel.

5. The fuel injection apparatus of claim 3, further including at least one position sensing device for detecting the position of said piston in said channel.

6. The fuel injection apparatus of claim 5, wherein said position sensing device is an electric switch.

7. A fuel injection system comprising:
a fuel injection apparatus, comprising an injector body casting containing a fuel passage and at least one orifice communicating with to said fuel passage to discharge fuel, a common rail provides high pressure fuel supply to said fuel passage, a nozzle valve element slidably disposed adjacent said orifice, controlling fuel flow by moving from an open position in which said fuel passage is fluidly connected to combustion chamber, and a closed position in which said fuel passage is disconnected to combustion chamber, and at least one volume changing device having no more than two openings, one of which communicates to said fuel passage, and being configured to change its volume with the fuel pressure inside said fuel passage when said nozzle valve is in its open position;
a fuel pressure sensor for measuring fuel pressure inside said fuel passage; and
a timing means measuring the time for fuel pressure inside said fuel passage to change from an initial value to a predetermined value when said nozzle valve is in its open position.

8. The fuel injection system of claim 7, further including a shutoff value for controlling fuel flow from said common rail to said fuel passage in said injector body.

9. The fuel injection system of claim 7, wherein said volume changing device includes at least one channel with a piston disposed inside and said piston has a spring mounted at one end of said channel for controlling the volume of said volume changing device.

10. The fuel injection system of claim 9, wherein the moving range of said spring is limited by two retainers inside said channel.

11. The fuel injection system of claim 9, further including at least one position sensing device for detecting the position of said piston in said channel.

12. The fuel injection apparatus of claim 11, wherein said position sensing device is an electric switch.

13. A method for detecting the deterioration of a fuel injection apparatus that comprises an injector body casting containing a fuel passage and at least one orifice communicating to said fuel passage for discharging fuel, a common rail providing high pressure fuel supply to said fuel passage, a nozzle valve element slidably disposed adjacent said injector orifices, controlling fuel flow by moving from an open position in which said fuel passage is fluidly connected to combustion chamber, and fuel flows through said orifice under pressure provided by said common rail, and a closed position in which said fuel passage is disconnected to combustion chamber, and fuel flow is blocked by said nozzle valve, and at feast one volume changing device having no more than two openings, one of which communicates to said fuel passage, and being configured to change its volume with the fuel pressure inside said fuel passage when said nozzle valve is in its open position, comprising steps of:
energizing said nozzle valve to its open position to discharge discharging fuel through said injector orifice;
measuring volume changing time, which is defined as the time for said volume changing device to change its volume from an initial value to a predetermined value during fuel discharging; and
calculating deterioration values using said volume changing time.

14. The method of claim 13, further comprising the step of shutting off fuel supply from said common rail to said injector before measuring said volume changing time.

15. The method of claim 13, further comprising the step of using said deterioration values for changing the open time of said nozzle valve to adjust fuel flow rate in feedback control.

16. The method of claim 13, further comprising the step of using said deterioration values for controlling fuel pressure inside said fuel passage to adjust fuel flow rate in feedback control.

17. The method of claim 13, further comprising the step of using said deterioration values for changing fuel injection frequency, which is defined as fuel discharge times in a given period of time, to adjust fuel flow rate in feedback control.

* * * * *